US007810141B2

(12) United States Patent
Takahashi

(10) Patent No.: US 7,810,141 B2
(45) Date of Patent: Oct. 5, 2010

(54) COMMUNICATION DEVICE, COMMUNICATION SYSTEM AND COMMUNICATION METHOD

(75) Inventor: Hideki Takahashi, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 946 days.

(21) Appl. No.: 11/649,332

(22) Filed: Jan. 3, 2007

(65) Prior Publication Data

US 2007/0162960 A1    Jul. 12, 2007

(30) Foreign Application Priority Data

Jan. 6, 2006   (JP) ............................. 2006-001461

(51) Int. Cl.
*G06F 15/16* (2006.01)
(52) U.S. Cl. .................... 726/4; 455/410; 709/220
(58) Field of Classification Search ............ 726/4; 455/410; 709/220
See application file for complete search history.

(56) References Cited

U.S. PATENT DOCUMENTS

| 7,058,719 | B2 * | 6/2006 | Motoyama | 709/220 |
| 7,313,384 | B1 * | 12/2007 | Meenan et al. | 455/410 |
| 2004/0003060 | A1 * | 1/2004 | Asoh et al. | 709/220 |
| 2005/0265552 | A1 * | 12/2005 | Olson et al. | 380/270 |

* cited by examiner

*Primary Examiner*—Kambiz Zand
*Assistant Examiner*—Amare Tabor
(74) *Attorney, Agent, or Firm*—Brinks Hofer Gilson & Lione

(57) ABSTRACT

Communication devices, communication systems and communication methods are disclosed, which are capable of easily changing the settings of a client and lightening the workload of a user. Even if the settings of a client device do not correspond to the settings of an access point, by changing the settings of the access point, setting information is sent to the client device to automatically change the settings of the client device to settings corresponding to the settings of the access point after change.

16 Claims, 3 Drawing Sheets

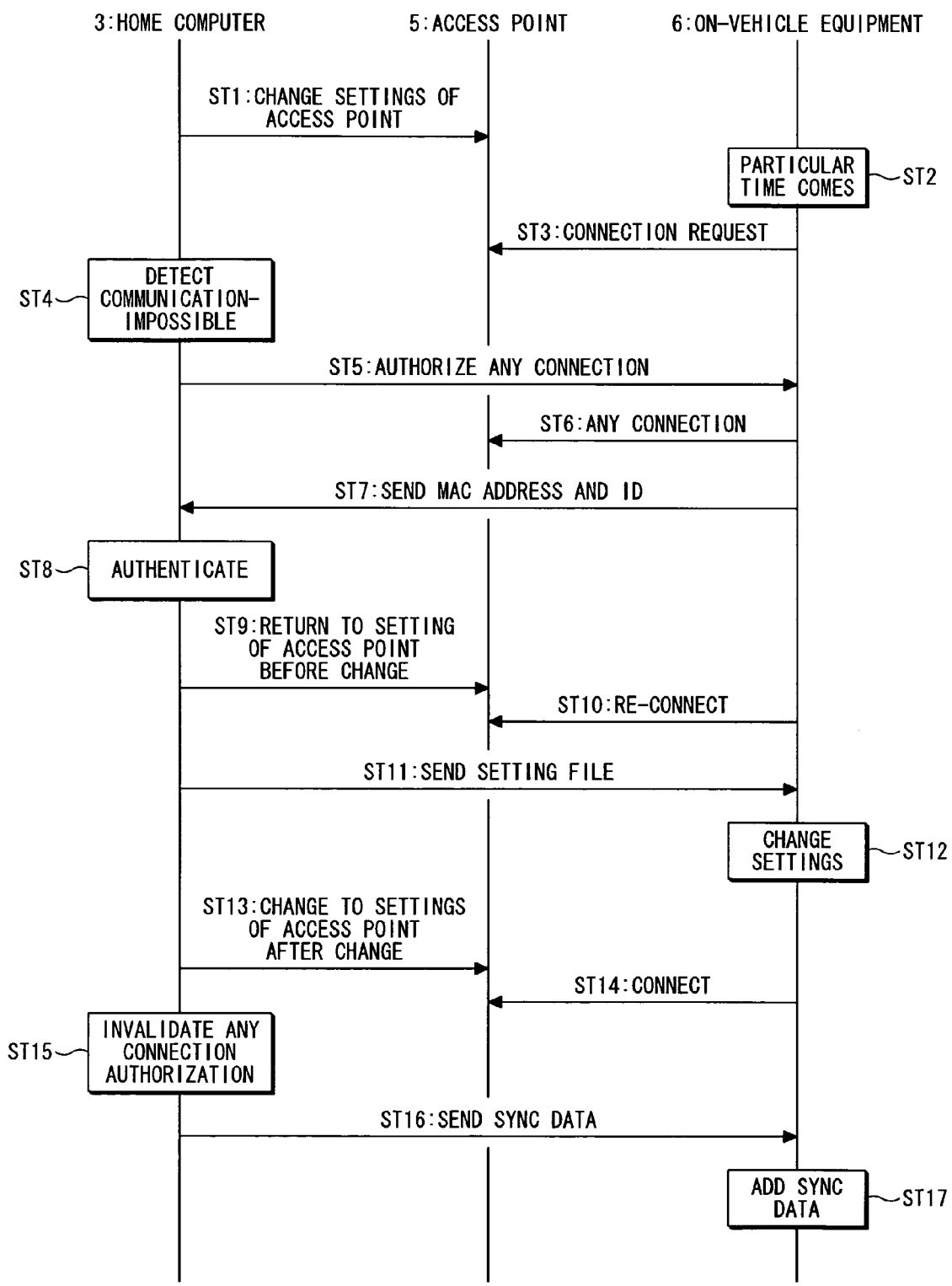

COMMUNICATION DEVICE, COMMUNICATION SYSTEM AND COMMUNICATION METHOD

RELATED APPLICATIONS

The present application claims priority to Japanese Patent Application Serial Number 2006-001461, filed Jan. 6, 2006, the entirety of which is hereby incorporated by reference.

BACKGROUND OF THE INVENTION

1. Field of the Invention

The present invention relates to a communication device, a communication system and a communication method, and more particularly to a communication device, a communication system and a communication method, which perform communication between a server and a client device via an access point.

2. Description of the Related Art

In recent years, as technology is applied to on-vehicle equipment, a system performing a synchronous (sync) process has been studied where a home computer acts as a server and an on-vehicle equipment acts as a client. The home computer and on-vehicle equipment are linked to download music data from the home computer to the on-vehicle equipment, and to synchronize the music data of the on-vehicle equipment with the music data of the home computer.

In such a system, it is assumed that an application for synchronous processing in the home computer and an application for synchronous processing in the on-vehicle equipment are simultaneously initialized at a particular time (same time on the same day of every week, for example) that comes periodically, which is fixed between the home computer and the on-vehicle equipment, and music data is automatically transferred (downloaded) from the home computer to the on-vehicle equipment by communication using wireless LAN or the like.

Further, it is assumed that the communication between the home computer and the on-vehicle equipment in making the synchronous processing is performed via an access point.

In order to perform the communication between the home computer and the on-vehicle equipment via the access point, it is necessary that various settings, such as an SSID (Service Set Identifier) and a WEP (Wired Equivalent Privacy), between the access point and the on-vehicle equipment match or correspond. (See Japanese Patent Laid-Open Publication (Kokai) No. 2004-7120, for example.)

Meanwhile, in the system performing the above-described synchronous processing, it is naturally assumed that a user changes the settings of the access point by operating the home computer.

In this case, it is necessary to allow the settings of the on-vehicle equipment to correspond to the settings of the access point. However, it has been conventionally assumed that individually changing the settings of the on-vehicle equipment is performed on the on-vehicle equipment side (in a vehicle).

However, individually changing the settings of the on-vehicle equipment on the on-vehicle equipment side in this manner causes problems of imposing large workloads to the user, and such problems became more conspicuous as the number of the on-vehicle equipments (vehicles) became larger.

SUMMARY OF THE INVENTION

Consequently, the present invention has been created in view of the problems, and it is an object of the invention to provide a highly convenient communication device, a communication system and a communication method, which are capable of easily changing the settings of the client and lightening the workload of the user.

To achieve the above-described object, the communication device according to the present invention is that a server is provided with one or more devices of (1) to (8) below.

(1) An access point setting changer that changes the settings of the access point based on the operation of the user.

(2) A setting contents memory that stores the setting contents of an access point before change when the access point setting changer changed the settings of the access point.

(3) A detector that, in the case where a particular time came after the settings of the access point were changed, detects that a connection to the access point of a client device is impossible in spite of a connection request of a fixed time or more from the client device.

(4) A connection authorizing device that, after the detector detected that a connection to the access point of the client device was impossible, authorizes a non-corresponding connection to the client device, wherein a non-corresponding connection is a connection to the access point in the state where settings corresponding to the settings of the access point after a change by the access point setting changer are not done.

(5) An authentication device that authenticates the client device after a non-corresponding connection was performed by the authorization of a connection by the connection authorizing device.

(6) A setting return processing device that performs a processing of returning the settings of the access point to the settings before the change by using the setting contents of the access point before the change stored in the setting contents memory after the authentication by the authentication device succeeded.

(7) A client setting changer that, after the setting return processing device returned the settings of the access point to the settings before the change, re-connects the client device and the access point under the settings before the change, and changes the settings of the client device to settings corresponding to the settings of the access point after the change by sending setting information for the client device, which corresponds to the settings of the access point after the change, to the client device.

(8) A setting switching device that switches the settings of the access point to the settings after the change after sending the setting information.

Then, according to the communication device constituted in this manner, even if the settings of the client device do not correspond to the settings of the access point, by changing the settings of the access point, it becomes possible to automatically change the settings of the client device to the settings corresponding to the settings of the access point after a change by returning the settings of the access point to the settings before the change to re-connect the client device to the access point after accepting a non-corresponding connection to authenticate the client device, and by sending the setting information to the client device in this state.

Further, the communication device according to the present invention is that a non-corresponding connection is any connection in the wireless LAN.

Then, according to the communication device constituted in this manner, even if the settings of the client device do not correspond to the settings of the access point by changing the settings of the access point, it becomes possible to start a processing for automatically changing the settings of the client device after the client device is surely connected to the access point by any connection.

Moreover, one communication device according to the present invention is that, in the case where a particular time came after the settings of the access point were changed by the operation of the user, the server sends setting information for a client device corresponding to the settings of the access point after a change to the client device in the state where the settings of the access point are returned to the settings before the change and the client device is connected to the access point, the settings of the client device are changed to the settings corresponding to the settings of the access point after the change, and then, after returning the settings of the access point to the settings after the change again, the client device is connected to the access point under the settings of the access point after the change and their corresponding settings of the client device after the change, and the communication is performed.

Then, according to the communication device constituted in this manner, even if the settings of the client device do not correspond to the settings of the access point by changing the settings of the access point, by returning the settings of the access point to the settings before a change to connect the client device to the access point and by sending the setting information to the client device in this state, it becomes possible to automatically change the settings of the client device to the settings corresponding to the settings of the access point after a change.

Further, the communication device according to the present invention is formed that the server performs a synchronous processing where data to be reproduced on the client device is synchronized with data to be reproduced on the server at a particular time via communications with the client device.

Then, according to the communication device constituted in this manner, in performing the synchronous processing of data to be reproduced, which was sent via the access point, between the server and the client device at a particular time after the settings of the access point were changed, it becomes possible to automatically change the settings of the client device to settings corresponding to the settings of the access point after a change.

Further, the communication device according to the present invention is that the data to be reproduced is music data.

Then, according to the communication device constituted in this manner, in performing the synchronous processing of music data, which was sent via the access point, between the server and the client device at a particular time after the settings of the access point were changed, it becomes possible to automatically change the settings of the client device to settings corresponding to the settings of the access point after a change.

Moreover, the communication system according to the present invention is that the server is provided with one or more devices of the above-described (1) to (8).

Then, according to the communication system constituted in this manner, even if the settings of the client device do not correspond to the settings of the access point by changing the settings of the access point, it becomes possible to automatically change the settings of the client device to settings corresponding to the settings of the access point after a change.

Furthermore, the communication system according to the present invention is that a non-corresponding connection is any connection in the wireless LAN.

Then, according to the communication system constituted in this manner, it becomes possible to start a processing for automatically changing the settings of the client device after surely connecting the client device to the access point by any connection.

Further, the communication system according to the present invention is formed that the server invalidates the function of the connection authorizing device until a particular time comes after changing the next settings of the access point after the change of all settings of at least one client device was completed.

Then, according to the communication system constituted in this manner, it becomes possible to reduce the danger of leaking data that the communication device has by limiting the time of accepting any connection.

Moreover, the communication system according to the present invention is formed such that the server and the client device perform a synchronous processing of synchronizing the data to be reproduced on the client device and the data to be reproduced on the server via communication at a particular time.

Then, according to the communication system constituted in this manner, in performing a synchronous processing of the data to be reproduced, which was sent via the access point, between the server and the client device at particular time after the settings of the access point were changed, it becomes possible to automatically change the settings of the client device to settings corresponding to the settings of the access point after a change.

Furthermore, the communication system according to the present invention is that the data to be reproduced is music data.

Then, according to the communication system constituted in this manner, in performing a synchronous processing of music data, which was sent via the access point, between the server and the client device at a particular time after the settings of the access point were changed, it becomes possible to automatically change the settings of the client device to settings corresponding to the settings of the access point after a change.

Further, the communication system according to the present invention is that the server is the home computer and the client device is the on-vehicle equipment.

Then, according to the communication system constituted in this manner, even if the settings of the on-vehicle equipment do not correspond to the settings of the access point, by changing the settings of the access point by the access point setting changer of the home computer, it becomes possible to automatically change the settings of the on-vehicle equipment to settings corresponding to the settings of the access point after a change.

Moreover, the communication method according to the present invention is that the setting contents of the access point before a change are stored when the settings of the access point were changed based on the operation of the user, the fact that a connection of the client device to the access point is impossible in spite of a connection request of a fixed time or more from the client device is detected in the case where the particular time came after the settings of the access point were changed, and then, non-corresponding connection, which is connection to the access point in the state where settings corresponding to the settings of the access point after a change are not done to the client device, is authorized, the client device is authenticated after the non-corresponding connection is established by the authorization, the settings of the access point are returned to the settings before the change after the authentication succeeded, by using the stored setting contents of the access point before the change, the client device and the access point are re-connected under the settings before the change, the setting information for the client device corresponding to the settings of the access point after change is sent from the server to the client device, the settings of the client device are changed to settings corresponding to the settings of the access point after change by the setting information sent, the settings of the access point are switched to the settings after the change after the setting information was sent, and the client device is connected to the access point under the settings of the access point after the change and their corresponding settings of the client device after the change to perform communication.

Then, according to such a communication method, even if the settings of the client device do not correspond to the settings of the access point by changing the settings of the access point, it becomes possible to automatically change the settings of the client device to settings corresponding to the settings of the access point after a change.

Further, the communication method according to the present invention is that non-corresponding connection is any connection in the wireless LAN.

Then, according to such a communication method, it becomes possible to start a processing for automatically changing the settings of the client device after surely connecting the client device to the access point by any connection.

Further, the communication method according to the present invention is that any connection is not authorized until a particular time comes after changing the next settings of the access point after the change of all settings of at least one client device was completed.

Then, according to such a communication method, it becomes possible to reduce the danger of leaking data that the communication device has by limiting the time of accepting any connection.

Moreover, the communication method according to the present invention is that a synchronous processing of synchronizing the data to be reproduced on the client device and the data to be reproduced on the server is performed between the server and the client device via communication at a particular time.

Then, according to such a communication method, in performing a synchronous processing of data to be reproduced, which was sent via the access point, between the server and the client device at a particular time after the settings of the access point were changed, it becomes possible to automatically change the settings of the client device to settings corresponding to the settings of the access point after a change.

Further, the communication method according to the present invention is that the data to be reproduced is music data.

Then, according to such a communication method, in performing a synchronous processing of music data, which was sent via the access point, between the server and the client device at a particular time after the settings of the access point were changed, it becomes possible to automatically change the settings of the client device to settings corresponding to the settings of the access point after a change.

According to the present invention, the settings of the client device can be automatically changed to settings corresponding to the settings of the access point after a change. As a result, the settings of the client can be easily changed, the workload of the user is lightened, and convenience can be improved.

Further, according to the present invention, such automatic change of settings of the client can be performed under the state where the danger of leaking data is reduced. As a result, the safety of communication can be secured.

Moreover, according to the present invention, the settings of the on-vehicle equipment particularly in performing a synchronous processing between the home computer and the on-vehicle equipment can be done easily.

BRIEF DESCRIPTION OF THE DRAWINGS

FIG. 3 is a flowchart showing one embodiment of a communication method.

DESCRIPTION OF THE PREFERRED EMBODIMENTS

Hereinafter, one embodiment of a communication device and communication system will be described referring to FIG. 1 and FIG. 2.

Figure 1:
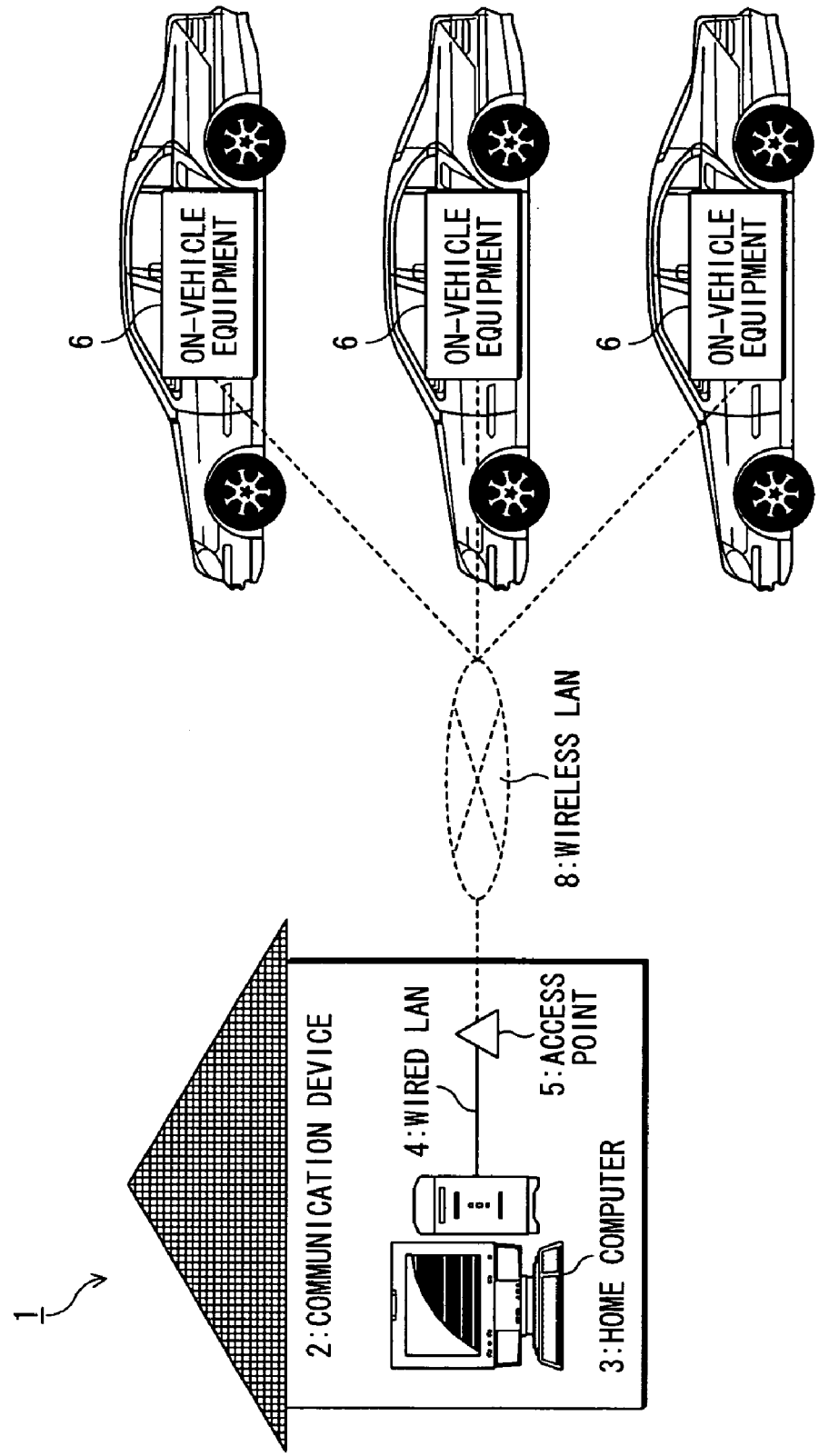
FIG. 1 is a constitution view showing an outline of one embodiment of a communication system and a communication device.

As shown in FIG. 1, a communication system 1 includes a communication device 2 that includes a home computer 3 acting as a server and an access point 5 connected to the home computer 3 via a wired LAN 4.

Additionally, the communication system 1 includes a plurality of (three in FIG. 1) on-vehicle equipment 6 acting as client devices.

The access point 5 and the on-vehicle equipment 6 are connectable to each other via a wireless LAN 8, thereby allowing the home computer 3 and the on-vehicle equipment 6 to communicate with each other via the access point 5.

The communication system 1 connects the on-vehicle equipment 6, where settings corresponding to (including matched settings, the same applies below) the settings of the access point 5 are done, to the access point 5 at a particular time that is fixed between the home computer 3 and the on-vehicle equipment 6 (hereinafter, referred to as a particular time), which comes periodically, by using a connection request from the on-vehicle equipment 6 to the access point 5 as a trigger.

Note that the particular time may be the same time on the same day of every week, for example, or may be the same time on the same date of every month. Further, as the settings of the access point 5 and the on-vehicle equipment 6, settings of SSID, settings of WEP or the like may be cited, for example.

Herein, for the sake of convenience, a connection between the access point 5 and the on-vehicle equipment 6 in the state where the settings of the access point 5 and the settings of the on-vehicle equipment 6 correspond to each other should be referred to as normal connection.

The communication system 1 performs communications between the home computer 3 and the on-vehicle equipment 6 via the access point 5 in the state where a normal connection is established between the access point 5 and the on-vehicle equipment 6.

In performing the communications, the communication system 1 performs a synchronous processing (hereinafter, referred to as sync processing) that synchronizes music data on the on-vehicle equipment 6 with music data on the home computer 3.

Figure 2:
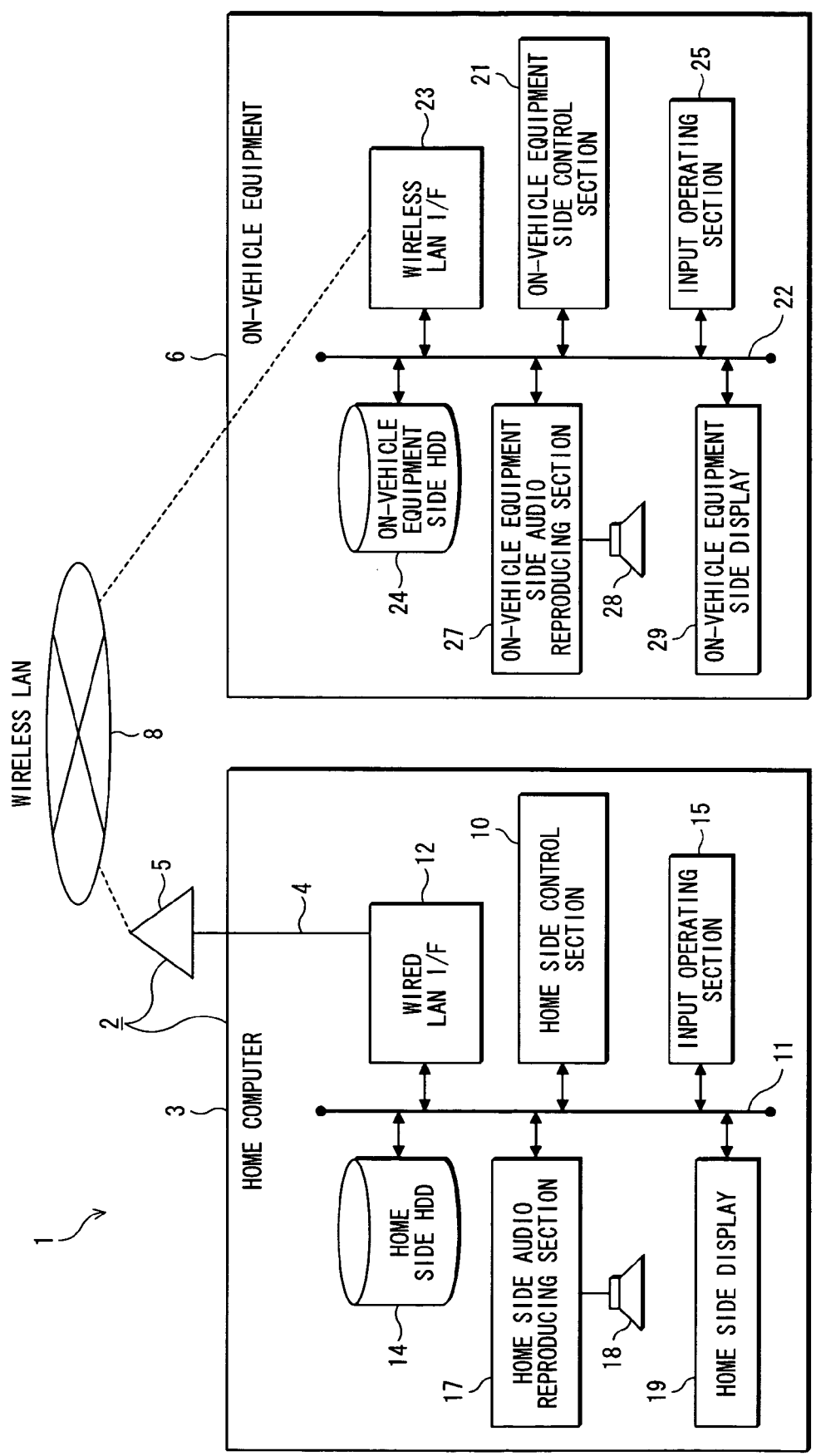
FIG. 2 is a block diagram showing details of one embodiment of a communication system and a communication device.

Explaining the home computer 3 in more detail, the home computer 3 includes a home side control section 10 as shown in FIG. 2 that performs various processing and controls to allow the home computer 3 to execute an application software (hereinafter, referred to as a home side application) to perform communication with the on-vehicle equipment 6.

A wired LAN interface (I/F) 12 is connected to the home side control section 10 via a system bus 11, and the wired LAN 4 is connected to the wired LAN interface 12.

A home side hard disk drive (HDD) 14 is connected to the home side control section 10 via the system bus 11, and music data that the home computer 3 has (hereinafter, referred to as home side music data) is stored in the home side hard disk drive 14.

The home side control section 10 reads sync data (for example, music data updated from the previous particular time out of home side music data), which is necessary data for a sync processing, from the home side hard disk drive 14 in the state where normal connection of the on-vehicle equipment 6 to the access point 5 was done at a particular time.

Then, the home side control section 10 sends the sync data read from the home side hard disk drive 14 from the wired LAN interface 12 to the on-vehicle equipment 6, to which a normal connection was done, as a sending destination.

The sync data sent from the wired LAN interface 12 is sent to the wireless LAN 8 via the access point 5, and received by the on-vehicle equipment 6 after passing through the wireless LAN 8.

An input operating section 15 is connected to the system bus 11, and the user is allowed to perform various input operations required for changing the settings of the access point 5, reproducing the home side music data, or the like to the home computer 3.

A home side audio reproducing section 17 is connected to the system bus 11, and the home side audio reproducing section 17 reproduces home side music data that the user specified by operating the input operating section 15. The home side music data reproduced by the home side audio reproducing section 17 is outputted by voice from a speaker 18.

A home side display 19 is connected to the system bus 11, and various screens such as an operation screen for changing the settings of the access point 5 and an operation screen for selecting home side music data to be reproduced, for example, are displayed on the home side display 19. These screens are displayed when the home side control section 10 executes a home side application.

In this embodiment, the home side control section 10 functions as an access point setting changer, and in the case where the user changed the setting contents of the access point 5 by operating the input operating section 15, it changes the settings of the access point 5 by the communication with the access point 5 via the wired LAN 4 according to the changed setting contents.

Further, in this embodiment, the home side hard disk drive 14 functions as a setting contents memory, and stores the setting contents of the access point before a change by the control of the home side control section 10 when the home side control section 10 changed the settings of the access point.

Moreover, in this embodiment, the home side control section 10 functions as a detector, and detects that connection of the on-vehicle equipment 6 to the access point 5 is impossible in spite of a connection request of a fixed time or more from the on-vehicle equipment 6 in the case where particular time came after changing the settings of the access point.

Furthermore, in this embodiment, the home side control section 10 functions as a connection authorizing device, and authorizes any connection to the on-vehicle equipment 6 after the home side control section 10 detected that connection of the on-vehicle equipment 6 to the access point 5 was impossible.

The any connection is an example of a connection (non-corresponding connection) of the on-vehicle equipment 6 to the access point 5 in the state where settings corresponding to the settings of the access point 5 after change by the home side control section 10 are not performed, and it is connection having an opposite meaning to the above-described normal connection.

Further, in this embodiment, the home side control section 10 functions as an authentication terminal, and authenticates the on-vehicle equipment 6 after any connection of the on-vehicle equipment 6 to the access point 5 was applied based on the authentication of the any connection by the home side control section 10.

This authentication is conducted by receiving a MAC (Message Authentication Code) address and the ID of the on-vehicle equipment 6 from the on-vehicle equipment 6 having any connection with the access point 5 in the state where an ID (Identification) for authenticating the on-vehicle equipment 6 is stored in the home side hard disk drive 14 in advance, and by comparing the received ID of the on-vehicle equipment 6 with the ID for authentication.

Moreover, in this embodiment, the home side control section 10 functions as a setting return processing device, and performs a processing of returning the settings of the access point 5 to the settings before change after the authentication by the home side control section 10 succeeded, by using the setting contents of the access point 5 before change, which are stored in the home side hard disk drive 14, through the communication with the access point 5 via the wired LAN 4.

Furthermore, in this embodiment, the home side control section 10 functions as a client setting changer, and after the home side control section 10 returned the settings of the access point 5 to the settings before the change, it re-connects the on-vehicle equipment 6, to which settings corresponding to the settings before the change were performed, to the access point 5 under the setting before the change. This re-connection is the normal connection.

Then, the home side control section 10, by the function as the client setting changer, automatically changes the settings of the on-vehicle equipment 6 to settings corresponding to the settings of the access point 5 after the change by sending a setting file (setting information) for the on-vehicle equipment 6, which corresponds to the settings of the access point 5 after the change, to the re-connected on-vehicle equipment 6.

Further, in this embodiment, the home side control section 10 functions as a setting switching device, and switches the settings of the access point 5 to the settings after change after sending the setting file for the on-vehicle equipment 6.

According to such a constitution, even if the settings of the on-vehicle equipment 6 do not correspond to the settings of the access point 5, by changing the settings of the access point 5, it becomes possible to automatically change the settings of the on-vehicle equipment 6 to settings corresponding to the settings of the access point 5 after the change.

Further, in such occasion, it becomes possible to start a processing for automatically changing the settings of the on-vehicle equipment 6 after the on-vehicle equipment 6 is surely connected to the access point 5 by ANY connection.

Moreover, by sending of the setting file to the on-vehicle equipment 6 on a normal connection state under the settings before change instead of an ANY connection state, it becomes possible to reduce the danger of leaking the home side music data.

In addition to the above constitution, furthermore, in this embodiment, the home side control section 10 invalidates the function as the connection authorizing device until a particular time comes after changing the next settings of the access point 5 after the change of settings of all the on-vehicle equipment 6 (three on-vehicle equipment 6 in FIG. 1), which communicate with the home computer 3, is completed.

As described, by limiting a time of accepting any connection from the on-vehicle equipment 6, it becomes possible to reduce the danger of leaking the home side music data.

Next, the on-vehicle equipment 6 (only one is shown in FIG. 2) will be explained in detail. The on-vehicle equipment 6 has an on-vehicle equipment side control section 21 that performs various processing and controls to allow the on-vehicle equipment 6 to execute an application software (hereinafter, referred to as on-vehicle side application) to communicate with the home computer 3.

A wireless LAN interface (I/F) 23 is connected to the on-vehicle equipment side control section 21 via a system bus 22, and the on-vehicle equipment 6 is connectable to the wireless LAN 8 via the wireless LAN interface 23.

An on-vehicle equipment side hard disk drive (HDD) 24 is connected to the on-vehicle equipment side control section 21 via the system bus 22 on which music data is stored at the on-vehicle equipment 6 (hereinafter, referred to as on-vehicle equipment side music data).

The on-vehicle equipment side control section 21 performs the sync processing at a particular time by adding sync data sent from the home computer 3 to the on-vehicle equipment side music data on the on-vehicle equipment side hard disk drive 24.

An input operating section 25 is connected to the system bus 22, and the user performs various input operations required for reproducing the on-vehicle equipment side music data from the input operating section 25.

An on-vehicle equipment side audio reproducing section 27 is connected to the system bus 22, and the on-vehicle equipment side audio reproducing section 27 reproduces on-vehicle equipment side music data that the user specified by the operation of the input operating section 25. The on-vehicle equipment side music data reproduced by the on-vehicle equipment side audio reproducing section 27 is outputted by voice from the speaker 28.

An on-vehicle equipment side display 29 is connected to the system bus 22, and various screens such as an operation screen for selecting on-vehicle equipment side music data to be reproduced, for example, are displayed on the on-vehicle equipment side display 29. This screen is displayed when the on-vehicle equipment side control section 21 executes the on-vehicle equipment side application.

The on-vehicle equipment side control section 21 outputs a connection request (request of normal connection) for a synchronous processing to the access point 5 at particular time. Now, since the settings of the on-vehicle equipment 6 do not correspond to the settings of the access point 5 at a particular time immediately after the settings of the access point 5 were changed, it is impossible to allow the on-vehicle equipment 6 to make normal connection to the access point 5.

The on-vehicle equipment side control section 21, when the home side control section 10 authorized any connection, allows the on-vehicle equipment 6 to make any connection to the access point 5.

Further, the on-vehicle equipment side control section 21 sends the MAC address and the ID of the on-vehicle equipment 6 to the home computer 3 in authenticating the on-vehicle equipment 6 by the home side control section 10.

Moreover, after authentication of the on-vehicle equipment 6 by the home side control section 10 succeeded and the settings of the access point 5 were returned to the settings before change, the on-vehicle equipment side control section 21 re-connects (normal connection) to the access point 5. At this point, since settings before the change, which correspond to each other, are applied to the on-vehicle equipment 6 and the access point 5, this re-connection is properly done.

Furthermore, the on-vehicle equipment side control section 21, by receiving a setting file for the on-vehicle equipment 6, which was sent from the home computer 3 via the access point 5 and using the received setting file, changes the settings of the on-vehicle equipment 6 to settings corresponding to the settings of the access point 5 after change.

Then, the on-vehicle equipment side control section 21 performs the sync processing by making normal connection to the access point 5 under the settings after change.

Next, description will be made for one embodiment of a communication method by referring to FIG. 3. Note that the communication method in this embodiment is executed by using the above-described communication system 1 for convenience, but it may be executed by using a constitution other than the communication system 1.

Further, in the initial state, it is assumed that the access point 5 and the on-vehicle equipment 6 are applied with the settings before a change corresponding to each other. Note that it is a matter of course that the settings of the on-vehicle equipment 6 before a change may be the one that was automatically done by the communication between the home computer 3 and the on-vehicle equipment 6.

Then, when the user changes the setting contents of the access point 5 from the initial state by operating the input operating section 15 on step 1 (ST1) of FIG. 3, the home side control section 10 of the home computer 3 executes the home side application to change the settings of the access point 5.

Next, as shown on step 2 (ST2), when a particular time comes after changing the settings of the access point 5, the on-vehicle equipment side control section 21 of the on-vehicle equipment 6 executes the on-vehicle equipment side application on the subsequent step 3 (ST3) to output a connection request to the access point 5.

Next, on step 4 (ST4), by the execution of the home side application of the home side control section 10, the fact that the on-vehicle equipment 6 cannot be connected to the access point 5 is detected despite that the connection request on step 3 (ST3) was made for a fixed time.

Next, on step 5 (ST5), by the execution of the home side application of the home side control section 10, any connection to the access point 5 is authorized to the on-vehicle equipment 6.

Next, on step 6 (ST6), by the execution of the on-vehicle equipment side application of the on-vehicle equipment side control section 21, any connection of the on-vehicle equipment 6 to the access point 5 is performed.

Next, on step 7 (ST7), by the execution of the on-vehicle equipment side application of the on-vehicle equipment side control section 21, the MAC address and the ID of the on-vehicle equipment 6 are sent to the home computer 3 via the access point 5.

Next, on step 8 (ST8), by the execution of the home side application of the home side control section 10, the ID of the on-vehicle equipment 6, which was obtained from the on-vehicle equipment 6 on step 7 (ST7) and the ID for authentication in the home side hard disk drive 14 are compared to authenticate the on-vehicle equipment 6.

Next, on step 9 (ST9), after the authentication of the on-vehicle equipment 6 succeeded, processing for returning the settings of the access point 5 to the settings before a change is performed by the execution of the home side application of the home side control section 10.

Next, on step 10 (ST10), after cutting off any connection by the execution of the on-vehicle equipment side application of the on-vehicle equipment side control section 21, re-connection (normal connection) of the on-vehicle equipment 6 to the access point 5 is done under the settings (settings before change) of the on-vehicle equipment 6 in the initial state.

Next, on step 11 (ST11), by the execution of the home side application of the home side control section 10, a setting file for the on-vehicle equipment 6 is sent from the home computer 3 to the on-vehicle equipment 6 via the access point 5.

Next, on step 12 (ST12), by the execution of the on-vehicle equipment side application of the on-vehicle equipment side control section 21, the setting file sent on step 11 (ST11) is received, and by using the received setting file, the settings of the on-vehicle equipment 6 are changed to settings corresponding to the settings of the access point 5 after change.

Next, on step 13 (ST13), by the execution of the home side application of the home side control section 10, the settings of the access point 5 are returned to the settings after change on step 1 (ST1).

Next, on step 14 (ST14), by the execution of the on-vehicle equipment side application of the on-vehicle equipment side control section 21, connection (normal connection) of the on-vehicle equipment 6 to the access point 5 is done under the settings of the on-vehicle equipment 6 after change. When the connection succeeds, the setting status of the on-vehicle equipment 6 controlled by the home side control section 10 is turned to "change completed" by the execution of the home side application of the home side control section 10.

Next, on step 15 (ST15), by the execution of the home side application of the home side control section 10, authorization of any connection to the on-vehicle equipment 6 is invalidated until particular time after the change of the next settings of the access point 5 after the change of settings was completed for all the on-vehicle equipment 6 communicating with the home computer 3.

Next, on step 16 (ST16), by the execution of the home side application of the home side control section 10, sync data is sent to the on-vehicle equipment 6 via the access point 5.

Next, on step 17 (ST17), by the execution of the on-vehicle equipment side application of the on-vehicle equipment side control section 21, the sync data sent on step 16 (ST16) is received, and a sync processing is performed by adding the received sync data into the on-vehicle equipment side hard disk drive 24.

As described above, according to the present invention, the settings of the on-vehicle equipment 6 can be automatically changed to settings corresponding to the settings of the access point 5 after change. As a result, the settings of the on-vehicle equipment 6 can be easily changed, and the workload of the user can be lightened to improve convenience.

Further, the automatic change of the settings of the on-vehicle equipment 6 can be performed under the state where the danger of leaking data is reduced (under the settings before change). As a result, the safety of communication can be secured.

Note that the present invention is not limited to the above-described embodiment but various changes can be made if necessary.

What is claimed is:

1. A communication device comprising:
   a server; and
   an access point configured to allow a client device to be connected to the server when settings of the access point correspond to settings of the client device at a particular time that is fixed between the server and the client device and to provide communication between the server and the client device, wherein a connection request from the client device to the access points acts as a trigger to connect the server to the client device and wherein the particular time occurs periodically;
   wherein the server comprises:
   an access point setting changer that changes the settings of the access point based on an operation of a user;
   a setting contents memory that stores the setting contents of the access point before a change when the access point setting changer changed the settings of the access point;
   a detector that, in the case where the particular time occurs after the settings of the access point were changed, detects that a connection to the access point of the client device is impossible in spite of a connection request of a fixed time or more from the client device;
   a connection authorizing device that, after the detector detected that connection to the access point of the client device was impossible, authorizes a non-corresponding connection to the client device, wherein a non-corresponding connection is a connection to the access point in the state where settings corresponding to the settings of the access point after the change by the access point setting changer are not done;
   an authentication device that authenticates the client device after the connection authorizing device authorizes the non-corresponding connection of the client device to the access point;
   a setting return processing device that performs, after a successful authentication, a process of returning the settings of the access point to the settings before the change by using the setting contents of the access point before the change, which are stored in the setting contents memory;
   a client setting changer that, after the setting return processing device returned the settings of the access point to the settings before the change, re-connects the client device and the access point under the settings before the change, and changes the settings of the client device to settings corresponding to the settings of the access point after the change by sending to the client device setting information for the client device, which corresponds to the settings of the access point after change; and
   a setting switching device that after sending the setting information, switches the settings of the access point to the settings after the change.

2. The communication device according to claim 1, wherein the non-corresponding connection is any connection in a wireless LAN.

3. A communication device comprising:
   a server; and
   an access point configured to allow a client device to be connected to the server when settings of the access point correspond to setting of the client device at a particular time that is fixed between the server and the client device and to provide communication between the server and the client device, wherein a connection request from the client device to the access point acts as a trigger to connect the server to the client device and wherein the particular time occurs periodically;

wherein the server is formed that, in a case where the particular time occurs after an operation of a user changes the settings of the access point, the server sends setting information for the client device corresponding to the settings of the access point after the change to the client device in the state where the settings of the access point are returned to the settings before the change and the client device is connected to said access point, the settings of the client device are changed to the settings corresponding to the settings of the access point after the change, and then, after returning the settings of the access point to the settings after the change again, the client device is connected to the access point under the settings of the access point after the change and their corresponding settings of the client device after the change, and the communication is performed.

4. The communication device according to claim 3, wherein the server is formed to perform a synchronous processing where data to be reproduced on the client device is synchronized with the data to be reproduced on the server at the particular time via the communication with the client device.

5. The communication device according to claim 4, wherein the data to be reproduced is music data.

6. A communication system comprising:
a communication device comprising a server and an access point; and
at least one client device;
wherein the system connects the at least one client device to the server when settings of the access point correspond to settings of the at least one client device at a particular time that is fixed between the server and the at least one client device and the system provides communication via the access point between the server and the at least one client device, wherein a connection request from the at least one client device to the access point acts as a trigger to connect the server to the client device and wherein the particular time occurs periodically;
wherein the server comprises:
an access point setting changer that changes the settings of the access point based on an operation of a user;
a setting contents memory that stores the setting contents of the access point before a change when the access point setting changer changed the settings of the access point;
a detector that, in the case where the particular time occurs after the settings of the access point were changed, detects that a connection to the access point of the client device is impossible in spite of a connection request of a fixed time or more from the client device;
a connection authorizing device that, after the detector detected that a connection to the access point of the client device was impossible, authorizes a non-corresponding connection to the client device, wherein a non-corresponding connection is a connection to the access point in the state where settings corresponding to the settings of the access point after change by the access point setting changer are not done;
an authentication device that authenticates the client device after the connection authorizing device authorizes the non-corresponding connection of the client device to the access point;
a setting return processing device that performs a process of returning the settings of the access point to the settings before the change by using the setting contents of the access point before the change, which are stored in the setting contents memory, after the authentication by the authentication device succeeded;
a client setting changer that, after the setting return processing device returned the settings of the access point to the settings before the change, re-connects the client device and the access point under the settings before the change, and changes the settings of the client device to settings corresponding to the settings of the access point after the change by sending to the client device setting information for the client device, which corresponds to the settings of the access point after the change; and
a setting switching device that after sending the setting information, switches the settings of the access point to the settings after the change.

7. The communication system according to claim 6, wherein the non-corresponding connection is any connection in the wireless LAN.

8. The communication system according to claim 7, wherein the server is formed to invalidate the function of the connection authorizing device until the particular time occurs after changing the next settings of the access point after the change of all settings of at least the one client device was completed.

9. The communication system according to claim 8, wherein the server and the client device are formed to perform a synchronous processing of synchronizing the data to be reproduced on the client device with the data to be reproduced on the server via the communication at the particular time.

10. The communication system according to claim 9, wherein the data to be reproduced is music data.

11. The communication system according to claim 10, wherein the server is a home computer and the client device is an on-vehicle equipment.

12. A communication method, comprising:
issuing a connection request from a client device to an access point at a particular time fixed between the server and at least one client device, the particular time occurring periodically;
connecting the client device to the access point in a case where the settings of the client device that issued the connection request correspond to the settings of said access point, and performing communication via the access point between the server and the client device;
storing the settings of the access point before a change of the settings when the settings of the access point are changed based on an operation of a user;
determining the fact that a connection of the client device to the access point is impossible in spite of a connection request of a fixed time or more from the client device in a case where the particular time occurs after the settings of the access point were changed, and then, authorizing a non-corresponding connection, wherein a non-corresponding connection is a connection to the access point in the state where settings corresponding to the settings of the access point after the change are not done to the client device;
authenticating the client device after establishing the non-corresponding connection;
returning, after the authentication, the settings of the access point to the settings before the change using the stored settings of the access point before the change;

re-connecting the client device and the access point under the settings before the change, the settings for the client device corresponding to the settings of the access point after the change is sent from the server to the client device;

changing the settings of the client device to the settings corresponding to the settings of the access point after the change;

switching, after the setting information is sent, the settings of the access point to the settings after the change; and connecting the client device to the access point using the settings of the access point after the change and the corresponding settings of the client device after the change to perform communication.

13. The communication method according to claim 12, wherein the non-corresponding connection is any connection in the wireless LAN.

14. The communication method according to claim 13, wherein the any connection is not authorized until the particular time occurs after changing the next settings of the access point after the change of all settings of at least said one client device was completed.

15. The communication method according to claim 14, wherein a synchronous processing of equalizing the data to be reproduced of the client device to the contents of the data to be reproduced of the server is performed between the server and the client device via the communication at the particular time.

16. The communication method according to claim 15, wherein the data to be reproduced is music data.

* * * * *